Sept. 8, 1964   W. J. BRADBURN, JR., ETAL   3,148,318
GENERATOR-FED EXTENDED RANGE MOTOR CONTROL
Filed April 11, 1960

INVENTORS
WILLIAM J. BRADBURN JR.
BY ALAN W. WILKERSON

Byron, Hume, Groen & Clement
ATTYS.

United States Patent Office 3,148,318
Patented Sept. 8, 1964

---

3,148,318
GENERATOR-FED EXTENDED RANGE MOTOR CONTROL
William J. Bradburn, Jr., Waukesha, and Alan W. Wilkerson, Racine, Wis., assignors to The Louis Allis Co., Milwaukee, Wis., a corporation of Wisconsin
Filed Apr. 11, 1960, Ser. No. 21,326
7 Claims. (Cl. 318—154)

This invention relates generally to a speed control system for a direct current motor and more particularly to a control circuit for effecting a cross-over between the armature voltage speed regulation range and the field voltage speed regulation range of an adjustable speed direct current motor.

It is well known that the speed of a D.C. motor may be controlled by controlling the armature voltage applied to the motor or by controlling the field excitation of the motor. If the motor field excitation is maintained constant and the armature voltage is varied, the motor is capable of delivering a constant torque over its adjustable speed range. When the armature voltage is constant and the motor field excitation is varied, the motor can deliver a constant horsepower over its speed range. Usually motor speed control systems are made to control the speed by either one of these two means.

It is also broadly known to combine both speed control methods; however, in the prior art the practice has been to provide dual control systems providing separate controlling means for the armature voltage control and field excitation control or to use an expensive and complicated system whereby the motor speed is governed by a tachometer generator coupled to the motor shaft.

Therefore, an object of the present invention is to provide an improved direct current drive system for machinery and the like that is effective for accurately regulating drive speed over a wide range of operating speeds.

An additional object of the present invention is to provide an improved control circuit arrangement for an adjustable speed direct current drive that effects a smooth and continuous transition between the armature voltage speed regulation range ond the field voltage speed regulation range of the D.C. motor.

A specific object of this invention is to provide a motor speed control system which is relatively inexpensive and uncomplicated and requires only a single potentiometer as a speed selecting means.

A still more specific object of this invention is to provide a D.C. motor speed control system incorporating a single speed selecting means, such as a potentiometer, for controlling the motor speed by varying the armature voltage and maintaining the motor field excitation at a fixed value so long as the armature voltage is less than the rated armature voltage of the motor. Such a condition exists when the motor speed is less than the base speed of the motor. Whenever the setting of the speed selecting means calls for an increase in the motor speed above the base speed, the system of this invention will automatically maintain the armature voltage at rated voltage and decrease the motor field excitation to a value required to obtain the desired speed as determined by the setting of the speed selecting means.

Briefly, the foregoing objects are accomplished by the provision of a generator and a motor having their armatures electrically interconnected. The generator is driven to produce a voltage across the motor armature in accordance with the generator field excitation. The speed of the motor is normally increased by adjusting a speed selecting means to increase the generator field excitation, and thereby the generator and motor armature voltage, until rated armature voltage is reached. When the setting of the speed selecting means calls for a further increase in the motor speed, the motor field winding excitation is automatically reduced while the motor armature voltage is maintained at its rated value. To provide continuous speed control with a smooth transition from armature control to field control, the speed selecting means may take the form of a potentiometer placed across the motor field winding. The motor field winding excitation is normally maintained at rated value and the setting of the potentiometer determines the motor speed by applying a corresponding signal to the generator field circuit, thereby controlling motor armature voltage in accordance with the setting of the potentiometer. There is also provided in the motor armature circuit a voltage comparison means for determining when the setting of the potentiometer causes the armature voltage to tend to exceed its rated value. When this condition occurs, a signal from the voltage comparison means causes the motor field winding excitation to be reduced an amount corresponding to the setting of the potentiometer. The signal applied to the generator field winding by the potentiometer is also correspondingly reduced to cause the motor armature voltage to return to its rated value. Therefore, a wide range of motor speed control is obtained by the use of a single potentiometer to provide a smooth transition between motor armature voltage control and motor field excitation control.

Other objects and features of the invention pertain to the particular structure and arrangements whereby the above identified and other objects of the invention are attained. The invention, both as to its structure and mode of operation will be understood by reference to the following disclosure and drawing, forming a part thereof, wherein.

Figure 1:
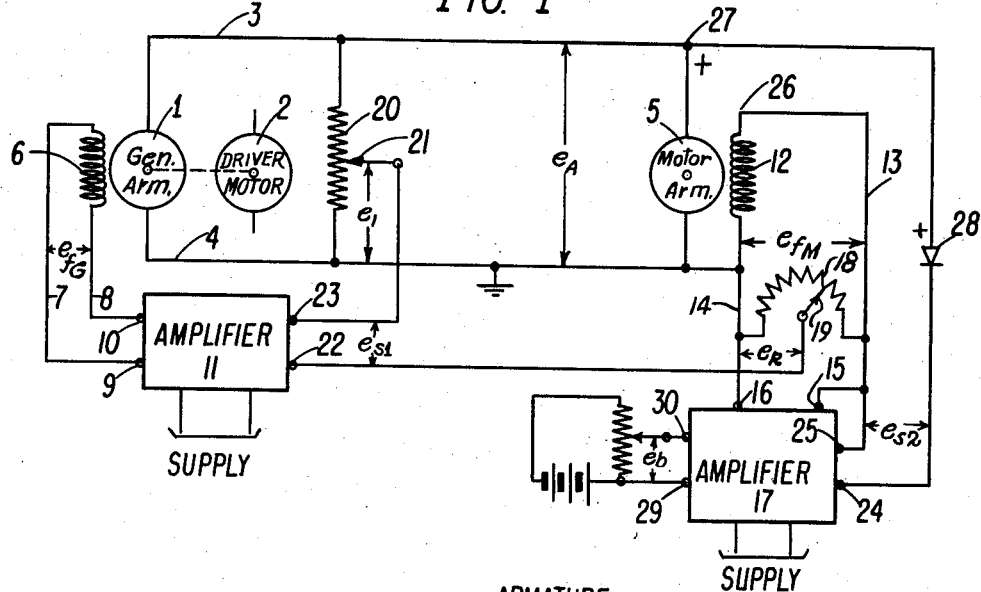
FIGURE 1 is a schematic diagram of a D.C. motor speed control system embodying this invention.

With reference now to FIGURE 1, there is shown a schematic diagram of a preferred D.C. motor speed control system embodying this invention. A Ward-Leonard drive system is shown to include a D.C. generator armature 1 mechanically rotated by a driver 2 and connected by conductors 3 and 4 to a D.C. motor armature 5. The conductor 4 can be considered the grounded or reference voltage conductor. A generator field coil 6 is connected through lines 7 and 8 to the output terminals 9 and 10, respectively, of a first control amplifier 11. A motor field coil 12 is similarly connected through conductors 13 and 14 to output terminals 15 and 16, respectively, of a second control amplifier 17.

Connected across field coil 12 is a potentiometer 18 having a wiper arm 19. Potentiometer 18 acts as the motor speed selecting device in this system and wiper arm 19 taps off a portion $e_R$ of the motor field voltage $e_{fM}$. Connected across the motor and generator armatures is a resistor 20 having a movable tap 21 which acts as a voltage divider for the generator armature voltage $e_A$. The portion of the armature voltage tapped off by tap 21 is designated as $e_1$. Thus the voltage $e_R$ is a direct function of the motor field excitation and the voltage $e_1$ is a direct function of motor armature energization.

Control amplifier 11 is a conventional linear amplifier having applied to the input terminals 22 and 23 thereof the voltages $e_R$ and $e_1$, respectively, so that the driving signal $e_{s1}$ is equal to $e_R - e_1$ and the output voltage $e_{fG}$ thereof, applied across field coil 6, is proportional to $e_{s1}$. In the alternative, a difference amplifier can be used wherein the voltage $e_1$ may be subtracted from voltage $e_R$ in an internal circuit to provide a difference signal $e_{s1}$.

Control amplifier 17 is a conventional difference amplifier which, for convenience in thinking and by way of example only, may be considered a magnetic amplifier having a first control winding connected at terminals 24 and 25, and a second control winding connected at terminals 29 and 30. At the first pair of input terminals 24 and 25 positive terminal 26 of the motor field coil 12 is connected to input terminal 24, and the positive terminal 27 of motor armature 5 is connected to the anode of a diode 28 whose cathode in turn is connected to input terminal 24. Thus, one driving signal $e_{s2}$ for control amplifier 17 is equal to the difference between the motor armature voltage $e_A$ and the motor field coil voltage $e_{fM}$ provided the armature voltage is greater than the field voltage. Because of the presence of diode 28, driving signal $e_{s2}$ is zero whenever the motor field voltage is greater than the motor armature voltage. Thus, so long as the field voltage is greater than the armature voltage, the output signal appearing across terminals 15 and 16 of amplifier 17 is constant and determined by a fixed bias signal $e_b$ applied to the other pair of signal terminals 29 and 30 of control amplifier 17. The signals to the pairs of signal inputs are arranged so that the difference or composite control signal to the amplifier 17 is equal to $e_b - e_{s2}$ and the bias signal $e_b$ is adjusted to a value such that with $e_{s2}$ equal to zero, rated field voltage is applied across field coil 12. By designing the motor so that rated armature voltage $e_A$ and field voltage $e_{fM}$ are identical, no change in field excitation can occur so long as the armature voltage is less than rated.

Figure 2:
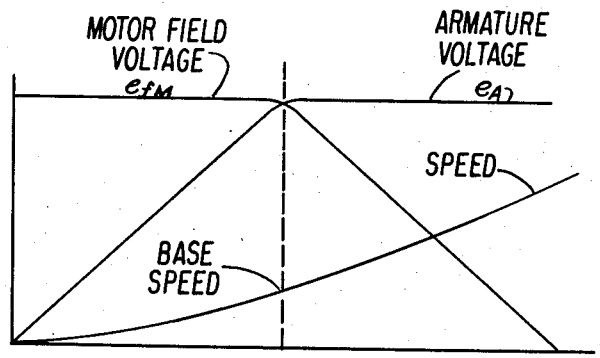
FIGURE 2 is a speed motor voltage diagram for the control system set forth in FIGURE 1.
Figure 3:
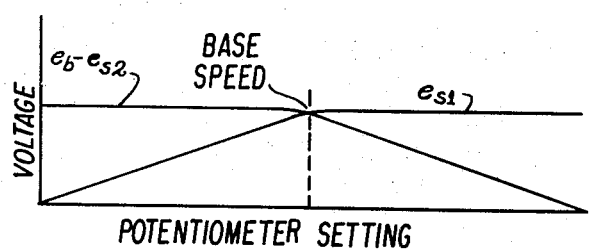
FIGURE 3 is a graphic representation of the multiple control voltages derived in the circuit for different control settings.

In operation then, it can be seen that this system functions in a manner as shown in FIGURES 2 and 3 so that with motor armature voltage at less than rated value the motor field voltage will be maintained at a constant rated value and a constant voltage will be applied across potentiometer 18. Under this condition the system acts as a conventional speed control system and maintains motor speed by controlling the voltage applied to the armature 5 of the motor. The motor speed is adjusted by varying the position of the wiper arm 19 on potentiometer 18, thereby varying the voltage $e_R$ and the signal $e_{s1}$ applied to control amplifier 11 which in turn produces the generator field excitation necessary to provide an armature voltage $e_A$ sufficient to maintain the motor speed at the value determined by the position of wiper arm 19 on potentiometer 18. This condition of control is maintained as shown in FIGURES 2 and 3 so long as motor speed is below base speed.

However, when wiper arm 19 is moved to such a position that the armature voltage $e_A$ tends to rise above its rated value thereby to cause motor speed to rise above base speed, the diode 28 becomes conducting and the driving signal $e_{s2}$ is applied to control amplifier 17. This driving signal opposes the bias signal $e_b$ so that the input to and the output from the amplifier 17 decrease accordingly and thereby causes a corresponding reduction in the motor field excitation and field voltage $e_{fM}$. Consequently, the voltage across potentiometer 18 decreases, thereby reducing the voltage $e_R$ for a given potentiometer setting. The result is that the armature voltage $e_A$ is restored to practically its rated value with the motor field voltage decreased and motor speed increased to correspond to the setting of wiper arm 19. This condition of control is maintained as shown in FIGURES 2 and 3 when motor speed is above base speed.

It is thus seen that when the motor control system is operating below motor base speed and in the armature control range the input $e_b - e_{s2}$ to the amplifier 17 and accordingly the voltage across the potentiometer 18 and the motor field voltage $e_{fM}$ are maintained constant. Each new setting of the wiper arm 19, from minimum towards maximum setting increases voltage $e_R$ which causes an increase in the armature voltage $e_A$ and its tapped voltage $e_1$. The tapped voltage $e_1$ is adjusted so that for each increase in $e_R$ the resulting increase in $e_1$ is of a lesser magnitude. Accordingly, $e_{s1}$ increases generally with $e_R$ but is subject to the negative feedback control of $e_1$. This damps the system and prevents any erratic runaway.

In the circumstance of system operation above motor base speed, and in the motor field control range, the input $e_{s1}$ to the amplifier 11 and accordingly, the armature voltage $e_A$ tend to remain constant. Each new setting of the wiper arm 19 from base speed setting toward maximum setting attempts to drive the armature voltage $e_A$ above its rated value and also above the motor field voltage $e_{fM}$ by an amount $e_{s2}$. The signal $e_{s2}$ is used to decrease the input $e_b - e_{s2}$ to the amplifier 17 and thereby diminish the motor field voltage $e_{fM}$ which in turn acts to decrease the armature voltage $e_A$ back to its rated value and to diminish the signal $e_{s2}$. Thus the amplifier 17 is subject to a negative feedback control which damps the system and prevents any erratic runaway.

Although not shown in the figure, a conventional IR drop compensation signal may be added to the circuit of control amplifier 11 in order to obtain better speed regulation with load changes. Accelerating and current limiting means and other modifications can be easily added to the circuit without altering the basic system as described above. Furthermore, the signal across potentiometer 18 can be obtained from a field current by using a series connected potentiometer as well as from the field voltage and parallel connection as described.

Finally, it should be noted that the control amplifiers shown may be rotating, magnetic, transistor, electronic or any other applicable type without departing from the scope of the invention. The diode may be of any suitable type such as a crystal rectifier or a vacuum tube.

In view of the foregoing, it can be appreciated that there has been disclosed an improved adjustable speed D.C. drive for a Ward-Leonard drive system which facilitates crossover between the armature voltage speed control range and the field voltage speed control range of the D.C. motor.

While there have been shown and described and pointed out the fundamental novel features of the invention as applied to the preferred embodiment, it will be understood that variations and modifications may be made therein and it is intended to cover in the appended claims all such variations and modifications as fall within the true spirit and scope of the invention.

What is claimed is:

1. In a D.C. motor control system of the type in which both the motor armature voltage and motor field winding excitation are variable to effect speed control, the combination comprising an armature voltage supply source connected to said armature, a field winding voltage supply source connected to said field winding, a settable speed selecting means connected across said field winding for obtaining a selected portion of the field voltage corresponding to the setting of said selecting means, first control means responsive to said selected portion for controlling the voltage applied to said armature by said armature voltage supply source, second control means normally operated to maintain said field voltage at a first predetermined value, and comparison means for producing a signal corresponding to the amount by which said armature voltage exceeds said field voltage, said signal being applied to said second control means for reducing said field voltage and for maintaining said armature voltage to a second predetermined value, whereby the motor speed is controlled by selectively varying both motor armature voltage and field excitation in accordance with the setting of said single speed selecting means.

2. The improved D.C. motor control system as defined in claim 1 wherein said first predetermined value of field voltage is the rated field voltage and said second predetermined value of armature voltage is rated armature voltage.

3. In a motor-generator drive system including a D.C. motor whose speed is to be controlled in accordance with the excitation provided by the armature and by the field winding thereof and a generator having an armature connected to the motor armature for applying a voltage thereto in accordance with the excitation provided by the generator field winding, the combination comprising a first control amplifier provided with input terminals and output terminals for controlling the excitation of said generator field winding, a second control amplifier provided with input terminals and output terminals for controlling the excitation of said motor field winding, a biasing source connected to the input terminals of said second control amplifier for biasing said amplifier to normally maintain said motor field winding voltage at a predetermined value, a settable speed controlling means connected to said motor field winding for establishing at the input terminals of said first amplifier a first control signal corresponding to a selected portion of said motor field winding voltage thereby controlling said generator field winding excitation and accordingly said armature voltage in accordance with said selected portion, comparison means for comparing said motor armature voltage with said predetermined value of voltage to produce a second control signal corresponding to the amount said motor armature voltage exceeds said predetermined value, and means for applying said second control signal to the input of said second amplifier in opposition to said biasing source thereby to decrease the output of said second control amplifier to below said predetermined value and return said motor armature voltage to said predetermined value, whereby the speed of said D.C. motor is increased in accordance with said setting by increasing the motor armature voltage up to said predetermined value and, thereafter, by decreasing said motor field winding excitation and maintaining said motor armature voltage constant.

4. A motor-generator drive system as defined in claim 3 wherein said comparison means is a uni-directional current conducting device connected between said motor armature and said motor field winding.

5. A motor-generator drive system as defined in claim 4 wherein said device is poled so that it is non-conducting when said motor armature voltage is less than said predetermined value and conducting to produce said second driving signal when said motor armature voltage exceeds said value.

6. In a motor-generator drive system including a D.C. motor whose speed is to be controlled in accordance with the excitation provided by the armature and by the field winding thereof, and a generator having an armature connected to the motor armature for applying a voltage thereto in accordance with the excitation provided by the generator field winding, the combination comprising a first control amplifier having a first output circuit and a first input circuit, said first output circuit including said generator field winding, a second control amplifier having a second output circuit and a second input circuit, said second output circuit including said motor field winding, means for applying a fixed bias signal to said second input circuit for normally maintaining a predetermined voltage across said second output circuit, a speed selecting potentiometer connected in said second output circuit and including an adjustable wiper arm for selecting a first signal corresponding to a portion of the voltage developed across said motor field winding, said wiper arm being connected in said first input circuit for applying said first signal to said first control amplifier, means for applying to said first input circuit a second lesser signal in opposition to said first signal and corresponding to a portion of said armature voltage thereby to regulate armature voltage and motor speed in accordance with the setting of said wiper arm on said potentiometer, means connected between like polarity ends of said motor armature and said motor field winding to provide a third signal when said motor armature voltage exceeds the motor field voltage, and means for applying said third signal to the input circuit of said second control amplifier to oppose said bias signal so that the output voltage of said second control amplifier is reduced an amount corresponding to the excess of said motor armature voltage over said motor field voltage, the reduction in said motor field voltage also reducing the voltage across said potentiometer to effect a corresponding reduction in said first signal thereby to decrease the generator field winding excitation and cause said motor armature voltage to be returned to said predetermined value.

7. In a motor-generator driving system including a D.C. motor whose speed is to be controlled in accordance with the excitation provided by the armature and by the field winding thereof, a generator having an armature connected to the motor armature for applying a voltage thereto in accordance with the excitation provided by the generator field winding, means for driving said generator, and an electrical power source, the combination comprising a first control amplifier for controlling the excitation of said generator field winding and having first power terminals, first input terminals and first output terminals, said first power terminals being connected to said power source, said first output terminals being connected across said generator field winding, a second control amplifier for controlling the excitation of said motor field winding and having second power terminals, second input terminals and second output terminals and reference terminals, said second power terminals being connected to said power source, said second output terminals being connected across said motor field winding, a reference signal source connected to said reference terminals for biasing said second control amplifier in such a manner that the motor field voltage is maintained at rated value when no signals are applied to said second input terminals, a potentiometer connected across said motor field winding, a settable wiper arm on said potentiometer for selecting a portion of said motor field voltage corresponding to the setting of said arm, means connecting said wiper arm to one of said first input terminals, an impedance connected across said motor armature, a movable tap on said impedance for selecting a lesser portion of said motor armature voltage, means connecting said movable tap to another of said first input terminals, the difference between said selected portions of said motor armature voltage and said motor field voltages providing a first signal to said first amplifier, said first control amplifier providing across its first output terminals an excitation voltage corresponding to said first signal in order to drive the motor at the speed determined essentially by the settling of said wiper arm on said potentiometer, means connecting the positive terminal of said motor field winding to one of said second input terminals, and a uni-directional current conducting device connected between the positive terminal of said motor armature and another of said second input terminals on said second control amplifier, said device being rendered non-conducting when said motor armature voltage is less than said motor field voltage and being rendered conducting when said motor armature voltage exceeds said rated voltage to provide a second signal, said second signal corresponding to the difference between said armature voltage and field voltage and acting in opposition to said bias signal to reduce the output voltage of said second control amplifier and thereby the motor field voltage, said selected portion of the motor field voltage tapped off by said wiper arm also being correspondingly reduced to reduce the value of said first signal so that said generator field excitation is reduced to return said motor armature voltage to its rated value, whereby said D.C. motor speed is selectively varied through its armature voltage control and field excitation control ranges by means of a single potentiometer.

References Cited in the file of this patent

UNITED STATES PATENTS

| | | |
|---|---|---|
| 2,484,836 | King | Oct. 18, 1949 |
| 2,519,370 | Herchenroeder | Aug. 22, 1950 |
| 2,586,284 | Abell | Feb. 19, 1952 |
| 2,789,262 | Forrestal et al. | Apr. 16, 1957 |
| 2,929,975 | Caldwell et al. | Mar. 22, 1960 |